(12) United States Patent
Klein

(10) Patent No.: US 10,635,851 B2
(45) Date of Patent: Apr. 28, 2020

(54) VIRTUALIZED SERVER SIDE RENDERING

(71) Applicant: SAP SE, Walldorf (DE)

(72) Inventor: Udo Klein, Nussloch (DE)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 15/486,484

(22) Filed: Apr. 13, 2017

(65) Prior Publication Data

US 2018/0300290 A1    Oct. 18, 2018

(51) Int. Cl.
| | | |
|---|---|---|
| *G06F 17/20* | (2006.01) |
| *G06F 40/103* | (2020.01) |
| *G06F 16/93* | (2019.01) |
| *G06F 16/957* | (2019.01) |

(52) U.S. Cl.
CPC ............ *G06F 40/103* (2020.01); *G06F 16/93* (2019.01); *G06F 16/9577* (2019.01)

(58) Field of Classification Search
CPC combination set(s) only.
See application file for complete search history.

(56) References Cited

U.S. PATENT DOCUMENTS

| | | | |
|---|---|---|---|
| 7,055,095 B1 | 5/2006 | Anwar | |
| 7,880,749 B2 | 2/2011 | Favart et al. | |
| 8,224,749 B2 | 7/2012 | Meier et al. | |
| 8,756,293 B2 * | 6/2014 | Duggal | G06F 9/468 |
| | | | 709/217 |
| 9,032,066 B1 | 5/2015 | Erdmann | |
| 9,467,434 B2 | 10/2016 | Shmulevich | |
| 2006/0010433 A1 * | 1/2006 | Neil | G06F 9/45533 |
| | | | 717/138 |
| 2007/0171921 A1 * | 7/2007 | Wookey | G06F 3/1415 |
| | | | 370/401 |
| 2008/0098391 A1 * | 4/2008 | Medvedev | G06F 9/44563 |
| | | | 718/1 |
| 2008/0201479 A1 * | 8/2008 | Husain | G06F 9/445 |
| | | | 709/227 |
| 2009/0228629 A1 * | 9/2009 | Gebhart | G06F 8/63 |
| | | | 711/6 |
| 2011/0106881 A1 | 5/2011 | Douville et al. | |
| 2015/0113009 A1 * | 4/2015 | Zhou | G06F 9/445 |
| | | | 707/755 |

* cited by examiner

*Primary Examiner* — Shahid K Khan

(74) *Attorney, Agent, or Firm* — Buckley, Maschoff & Talwalkar LLC

(57) ABSTRACT

Virtualized infrastructure instances are provided for running applications where electronic documents are rendered. The documents may comprise active content associated with risk of security issues. The documents are pre-processed to determine required software functionality for rendering. An index table including documents' characteristics relevant for displaying is generated. The characteristics include a correspondingly defined application for rendering a document, an OS for running the application, other. An identification of a document is received for displaying in a UI application separate from the virtualized instances. The first document is rendered on a virtualized instance from the infrastructure instances. The virtual instance is selected based on requirements for rendering the requested document, such as compatible application and OS. The rendered first document at the virtualized instance is displayed at the UI application on a virtual screen. The request for displaying is received by a user in a document analysis scenario.

16 Claims, 6 Drawing Sheets

VIRTUALIZED SERVER SIDE RENDERING

BACKGROUND

During different types of research, a user may be prompted to view content of electronic documents using the original applications suitable for previewing the documents. There are cases, where not only the content of the documents is required to be previewed, but also contents layout, style, formatting, and other documents' specifics. Such documents may be text documents, graphical documents, audio files, video records, etc. They may be stored in different tile formats, which are associated with different software applications for accessing, rendering, analyzing, modifying, etc. For example, during forensic investigations it is often necessary to view the content of documents using the original software applications. It may not be sufficient to read the text content of a document file, but to see the full layout.

Different document formats may require different applications to render them. The applications may allow presentation of "active content", when such content is part of a document. For example, Portable Document Format (PDF) files may contain Java Script® code, Microsoft® (MS) Office documents may include macros or Visual Basic® code, etc. It is possible that such documents contain viruses or other malicious content, which may harm the computing system, where the application for rendering the documents is running.

The files to be displayed, may be of specific document formats and types, and may be platform and/or operating system specific. There may be document formats that are available only for software products of a particular software/hardware vendor and for specific platform and device characteristics. For example, there are document formats that are available only for applications running on Microsoft® OS, such as Windows® 10. For example, some documents may be targeted to be rendered and manipulated on a particular type of a mobile device, a tablet, on a specific hardware infrastructure, etc., where a correspondingly required software infrastructure (OS and application) is required.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for virtualized server side rendering are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

To perform a preview and analysis over an electronic document and/or a file, machines with a suitable OS and viewer applications may be required. It may also be required to acquire the appropriate licenses to view the desired content and documents.

Figure 1:
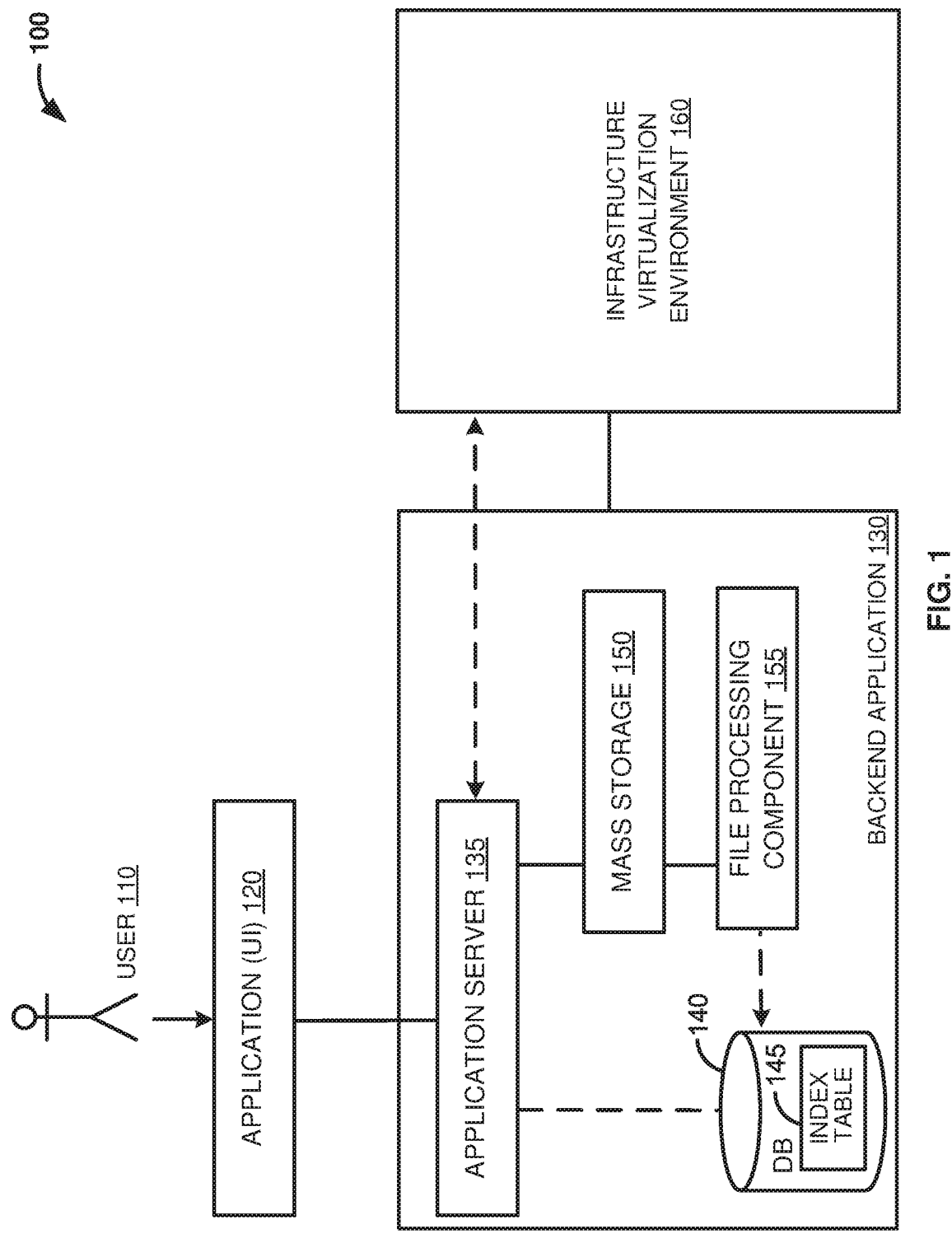
FIG. 1 is a block diagram illustrating an exemplary system for remote rendering of electronic documents on a virtualized server side, according to one embodiment.

FIG. 1 is a block diagram illustrating exemplary system 100 for remote rendering of electronic documents on a virtualized server side, according to one embodiment. Application 120 and application server 135 provide user interfaces (UIs), where software applications' content may be displayed. The application 120 provides a UI, which may be accessible for user 110. The user 110 may interact with application 120 with regards to rendering electronic documents of interest. The electronic documents may be stored at backend application 130, for example at a mass storage 150. Such electronic documents may be text documents, images, etc., and may include active content. Active content may be defined as additional functionality in a document file, such as macros, add-ins, data connections, etc. The application 120 may be a browser running on an operating system (OS) on a local computer machine or other hardware device e.g. a tablet, a mobile phone, etc.) The user 110 may request to display the electronic documents. The application 120 may lack capabilities to render all of the electronic documents. Additionally, the application 120 may be restricted for rendering external documents, where external documents may include active content associated with higher security risks. The electronic documents including active content may be associated with malware risks. Such documents may not be necessarily displayed locally on the machine, where the application 120 is running.

In one embodiment, the exemplary system 100 may be defined in a forensic scenario where the user 110 is an investigator, and the electronic documents may be an evidence that is reviewed for purposes of forensic investigations. As the electronic documents may be associated with a higher security risk when rendered, the exemplary system 100 provides a virtualized server side. At the virtualized server side, the electronic documents may be rendered and probabilities for spreading malware through rendering at the application 120 is eliminated.

In one embodiment, the electronic documents may be rendered at the application server 135. The user 110 may select a first document from the electronic documents and send a request for its rendering at the backend application 130. Rendering the selected first document may be associated with an available application supporting the document type, and a required OS for running the application and the application server 135.

The backend application 130 stores the electronic documents at the mass storage 150, and a file processing component 155 provides functionality to pre-process the electronic documents. The file processing component 155 includes logic associated with accessing and analyzing the documents in order to classify them based on determined document types. The classification of the documents may be stored in a database table, such as index table 145 at database (DB) 140 on the backend application 130. The index table 145 may include a number of attributes associated with characteristics of the analyzed electronic documents, such as document name, document type, associated applications and application versions for rendering, required OS infrastructure.

Once the document type of an analyzed electronic document is determined, the file processing component 155 may look up what application is required to render the document type. In one embodiment, the "look up" operation may be performed based on metadata including a list of available applications and application versions supporting rendering functionality for a document type, and also associated OSs and OSs' versions for running the application versions. Further, the file processing component 155 may determine the required OS. Infrastructure virtualization environment 160 is an infrastructure layer, associated with the backend application 130, that is setup in such a way that a number of the required OSs and application instances are instantiated and kept prepared for providing server side rendering for the electronic documents stored at the mass storage 150. In one embodiment, the prepared OSs and the application instances may be kept in a suspended state. The application instances may be running on corresponding servers installed on the prepared. OS running on available virtualized infrastructure instance. A copy of the required. OS containing the required application may be activated to serve requests for rendering received at the application 120 and transmitted to the backend application 130. The activation of a copy may be automated through the application server 135 and further it may take care to expose the "to be rendered" electronic document at the required application through a read only mount to the application 120. The electronic document may be rendered inside of a virtual machine (VM) container at the infrastructure virtualization environment 160.

In one embodiment, a dispatcher at the application server 135 may be a software module that provides user interface interactions received from the user 110, e.g. keystrokes and mouse commands, to the application utilized for rendering a requested document by the user 110. In addition, the dispatcher may return a screen output of the virtual screen of the OS instance running the application to the application 120 and thus to the user 110. After the user 110 is done exploring the requested document, the active VM container may be destroyed. Any malware that might have infected the OS instance on the VM container may be destroyed as well.

In one embodiment, to ensure that malware associated with requested and rendered electronic documents from the mass storage do not escape the active containers where required applications are running, a network connectivity restrictions may be imposed. Heavily restrictions on the network connectivity and file system access of the virtual OS instances may be defined. Network connectivity may be restricted to the connections opened by the dispatcher and a remote controller used for automation of the automation of activation of the infrastructure virtualization environment 160. File system access may be limited to a virtual file system at a VM container including a document mount, e.g. in a read-only mode.

Figure 2:
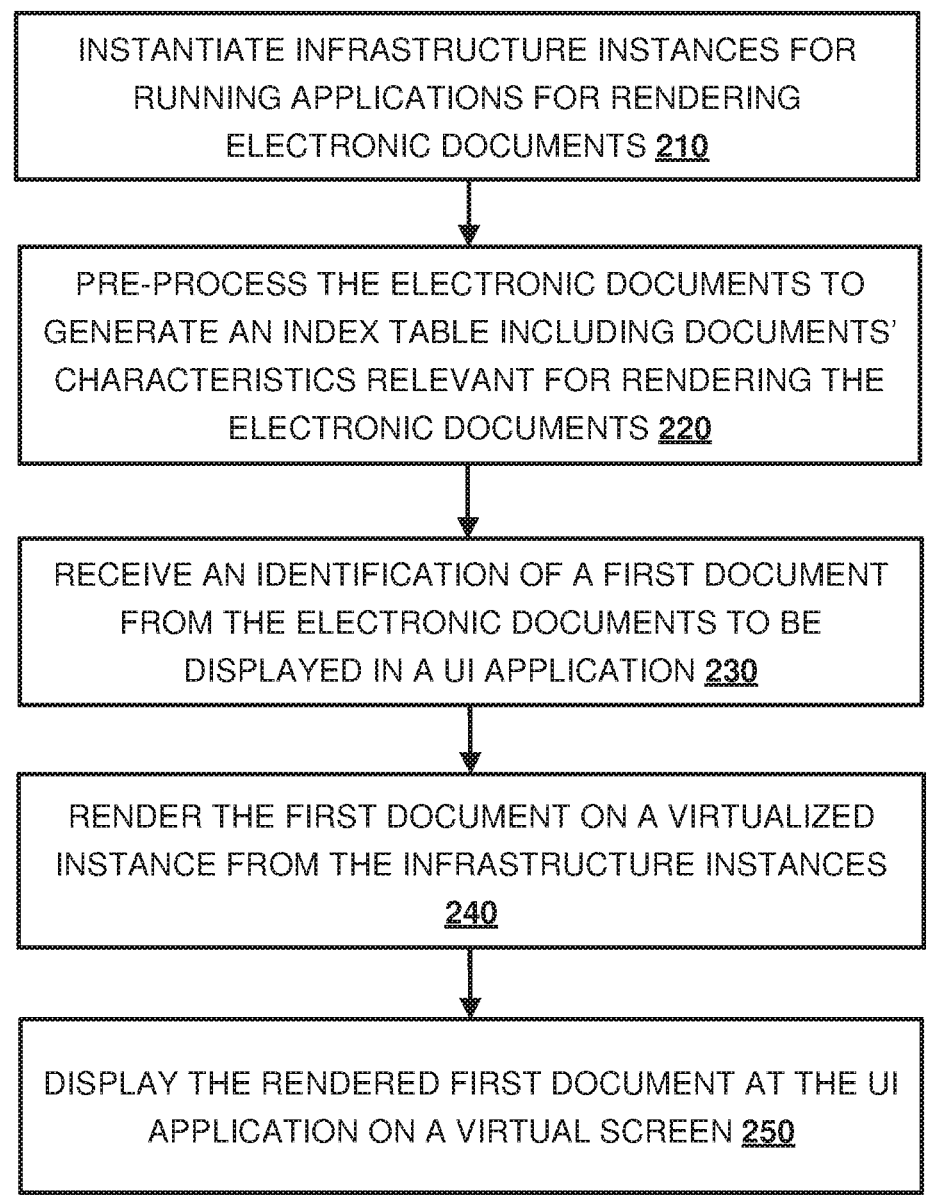
FIG. 2 is a flow diagram illustrating a process for remote rendering of electronic documents on a virtualized server side, according to one embodiment.

FIG. 2 is a flow diagram illustrating a process 200 for remote rendering of electronic documents on a virtualized server side, according to one embodiment. At 210, infrastructure instances for running applications for rendering electronic documents are instantiated. The infrastructure instances may be provided as a service. The infrastructure instances and the applications to be run may be associated with the document types of the electronic documents. The infrastructure instances may be set in a suspended mode as a prepared environment to serve rendering requests for documents/files of different type. The documents/files may be such as the electronic documents discussed in relation to FIG. 1 and the rendering requests may be received through a UI of an application and transferred to an application server at a backend part of the application. The received rendering requests may be for remote rendering through a virtual screen. The mere rendering is performed at the virtualized server side and no actual accessing and displaying of the requested file is achieved at the application, receiving the initial request from the user. The instantiated infrastructure instances may be provided with running OSs and installed applications on servers. The installed applications support rendering at least some of the documents from the electronic documents. For electronic documents, where the virtualized server side provides no available installed applications, a VM may be pooled and required software corresponding to the requested document may be installed and provided.

At 220, the electronic documents are pre-processed to generate an index table including documents' characteristics relevant for rendering the electronic documents. The index table may be such as the index table discussed in FIG. 1. The determination of document characteristics may be associated with determining required supporting software for rendering the electronic documents. For example, a document of a document type may require a macOS® and an available application version for rendering.

At 230, an identification of a first document from the electronic documents may be received. The received identification may be received at a backend server side of an application, when a user has provided the identification from a UI application associated with the backend part. The UI application may be a web browser, which is in communication with a web server at the backend part. In one embodiment, the identification of the first document may be associated with determining documents characteristics. Document characteristics may be included in the pre-generated index table in relation to the electronic documents. At 240, the first document is rendered on a virtualized instance from the infrastructure instances provided at 210. The rendering of the first document includes accessing and opening the first document at an available application installed on a server on a relevant OS running on a virtualized instance from the instantiated instances at 210. The available application is compatible with a document type of the first document. At 250, the rendered first document at the virtualized instance is displayed at the UI application on a virtual screen.

Figure 3:
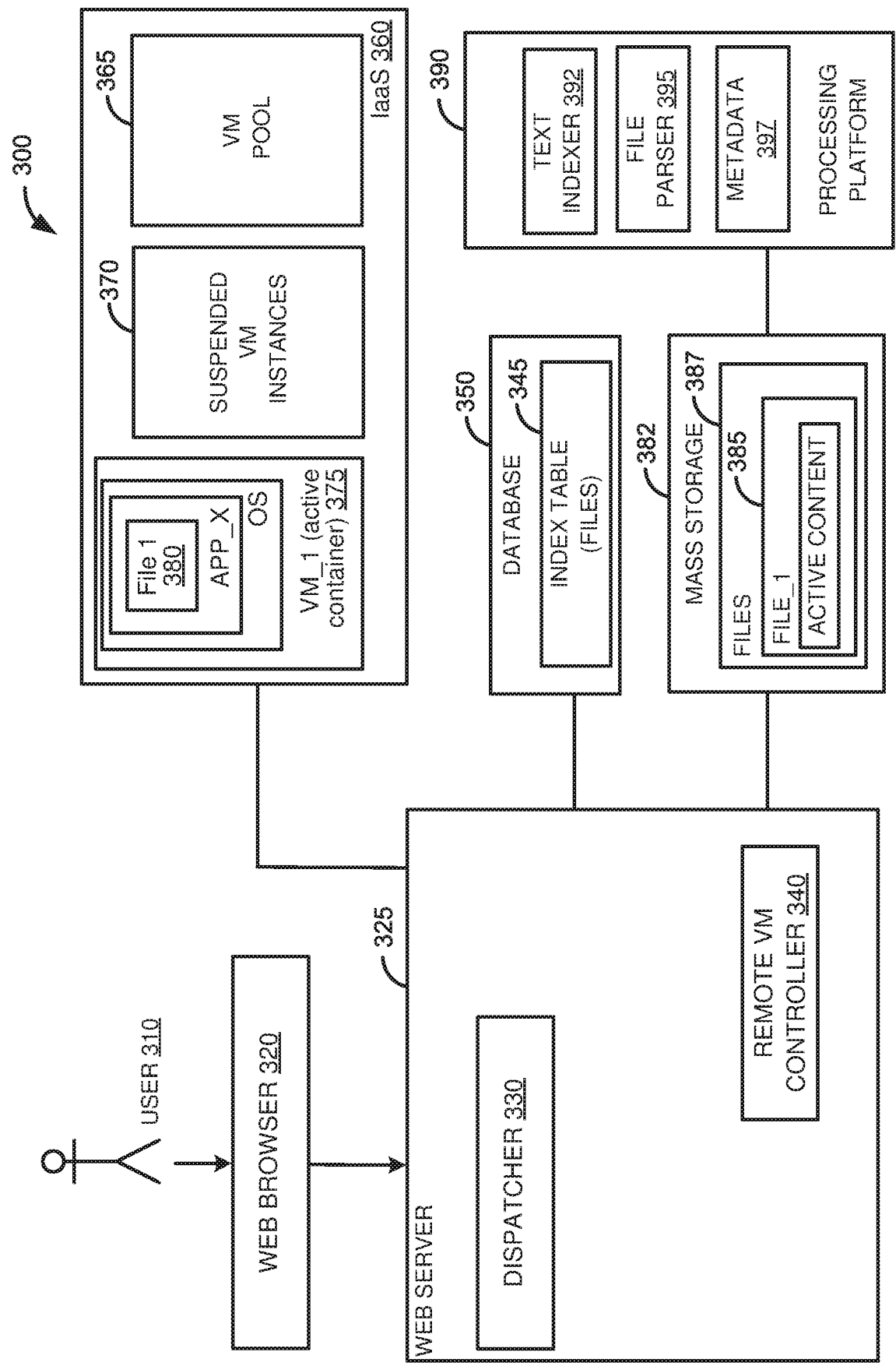
FIG. 3 is a block diagram illustrating an exemplary system for remote display of electronic documents in a browser application, where the electronic documents are rendered on a prepared virtualized server side ready for the electronic documents preview, according to one embodiment.

FIG. 3 is a block diagram illustrating an exemplary system 300 for remote display of electronic documents in a browser application, where the electronic documents are rendered on a prepared virtualized server side ready for the documents preview, according to one embodiment. A user 310 may communicate with a web browser 320 in a forensic scenario to perform an investigation task associated with reviewing an evidence document. Forensic investigations are usually associated with review and analysis over electronic documents, provided as evidence. Such evidence electronic documents may incorporate other documents in them. For example, the user 310 may request to render an evidence document such as an e-mail including a document, for example a WORD document having macros and/or other active content. The user 310 may provide an identification of a document of interest (evidence document associated with the forensic scenario) based on search criteria, such as name, type of document, date of the document, name of the associated forensic scenario, other. Web server 325 may be associated with the web browser 320 to handle forensic requests. The web server 325 includes a dispatcher 330 and a remote VM controller 340. The dispatcher 330 at the web server 325 provides user interface interactions received from the user 310 to the application utilized for rendering a requested evidence document.

In one embodiment, evidence documents are stored as files 387 at a mass storage 382 associated with the web server 324. The mass storage 382 may be associated with a processing platform 390 includes a text indexer 392, file parser 395, and metadata 397. The evidence document from the mass storage 382 may be analyzed based on implemented logic at processing platform 390. A document, such as 385 may be parsed by the file parser 395, and then indexed according to defined classification criteria according to the logic defined at the text indexer 392. When the 385 is analyzed, metadata 397 may be accessed to perform classification of 385 based on defined classification types. The classification types may be associated with document characteristics relevant for rendering the file. The classification types may include a document name, a document type, an available application for rendering a document, an associated application version supporting rendering, a compatible OS for running the available application.

The analysis of 385 may include a determination of a document type such as "e-mail". The document type may be associated with determining an application (and a relevant application version) for opening and displaying the file, a relevant OS for running the associated application, other. The text indexer 392 determines document characteristics associated with the evidence documents and relevant software and hardware details relevant for providing supporting functionality for rendering of evidence document's content. In one example, more than one application may be available for rendering 385, and more than one OS may be compatible with running an available application. The classifications defined for the evidence documents from the mass storage 382 may be stored in an index table 345 at database 350. The index table 345 may include rows corresponding to the files 387 and attributes associated with the classifications types defined for the analyzed files 387 based on the logic implemented in the text indexer 392.

In one embodiment, the user 310 may request to render 385, which comprises active content, where 385 is an e-mail document. The received request from the user 310 may be transmitted to the web server 325, where the dispatcher 330 may access the index table 345 and determine document characteristics of file_1 385. For example, an e-mail document may be associated with a document type "e-mail", and with a name "Evidence 1", with application for rendering—MS Outlook (with relevant supported versions), and an underlying supporting OS—e.g. Windows® OS (with relevant versions). Such application and OS may be provided on an instantiated infrastructure instance at Infrastructure as a Service (IaaS) 360 layer.

The web server 325 is associated with the IaaS 360 layer. The IaaS 360 includes a VM pool 365, which provides virtualization resources to instantiate infrastructure instances as a preparation infrastructural step for supporting remote rendering of requested documents through the web browser 320. Based on the VM pool 365, infrastructure instances are created and put in a suspended mode and stored as suspended. VM instances 370. The infrastructure instances in the suspended VM instances 370 may be such as the discussed. In relation to the infrastructure virtualization environment 160, FIG. 1 and the instantiated instances created at 210, FIG. 2. The remote VM controller 340 may provide infrastructure automation through activating a copy of an OS containing a required application for rendering requested documents. For example, the remote VM controller 340 may activate VM_1 375 where 385 may be rendered as "File 1" 380. On the activated instance VM_1 375, an application "APP_X" is running on a given OS.

In one embodiment, automation provided by the remote VM controller 340 may take care to expose the rendered "File 1" 380 to the application "APP_X" inside the VM container—VM_1 375 through a read only mount. The dispatcher 330 returns a screen Output to the web browser 320 and to user 110. The virtual screen at the web browser 320 is providing the screen output on the active VM instance, namely VM_1 375. After the user 110 is done exploring the requested document "File 1" 380, the active VM container for VM_1 375 may be destroyed. Any malware that might have infected the OS instance on the VM_1 375 may be destroyed as well.

Figure 4:
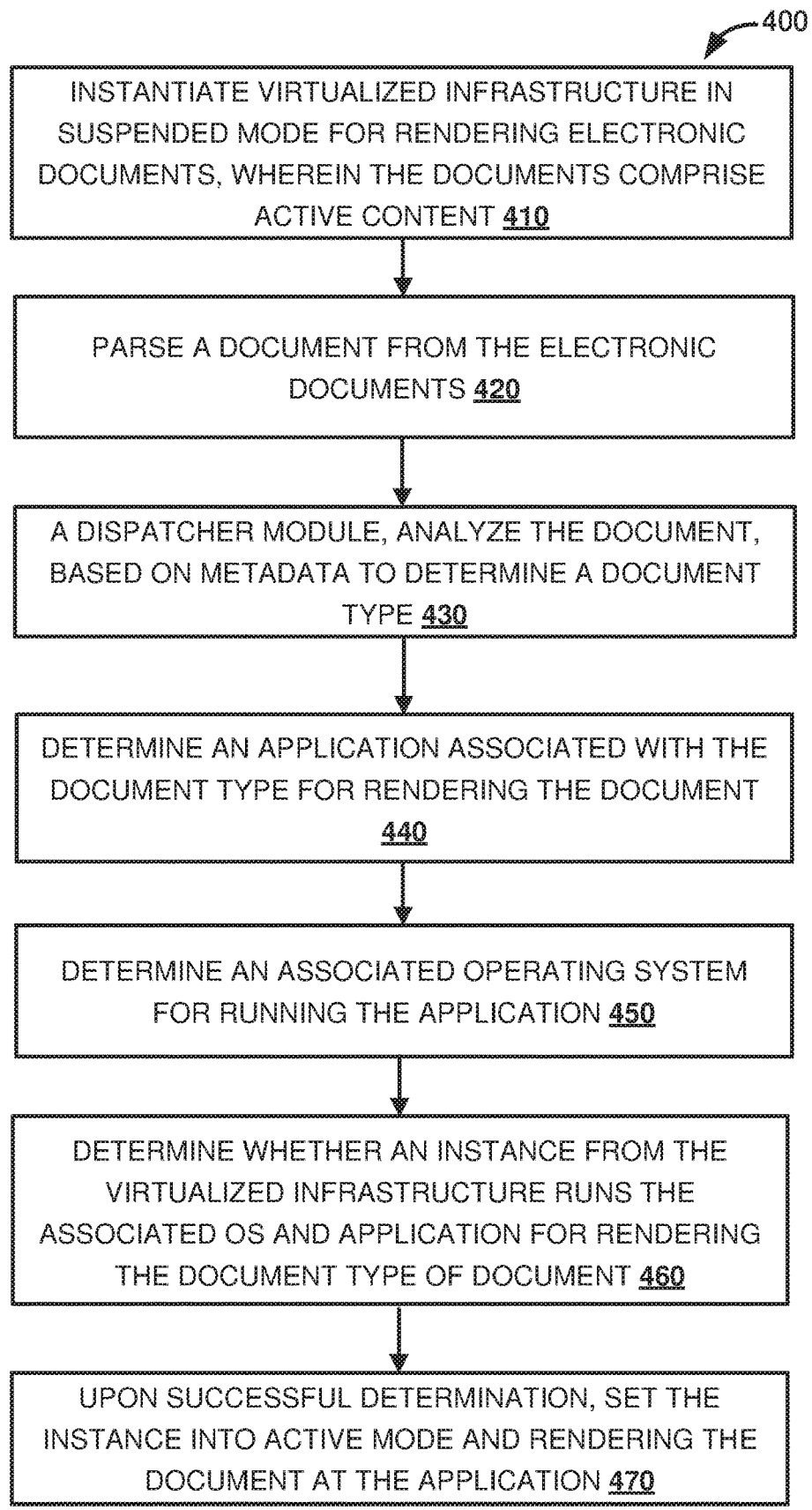
FIG. 4 is a flow diagram illustrating a process for remote rendering of an electronic document on compatible software solutions running on a virtualized infrastructure instance, according to one embodiment.

FIG. 4 is a flow diagram illustrating a process 400 for remote rendering of an electronic document on compatible software solutions running on a virtualized infrastructure instance, according to one embodiment. At 410, virtualized infrastructure is instantiated in suspended mode for rendering electronic documents. The electronic documents comprise active content. The electronic documents may be such as the evidence documents stored at the mass storage 382 at FIG. 3 and may be associated with forensic investigations. The electronic documents may be associated with a web server, where request for remote rendering of electronic documents may be received. The virtualized infrastructure may be such as the infrastructure virtualization environment 160, FIG. 1 and/or IaaS 360, FIG. 3. At 420, a document from the electronic documents is parsed. The parsing may be such as the discussed parsing performed by the file parser 395 at the processing platform 390, FIG. 3. At 430, a dispatcher analyzes the document. The dispatcher may be a module such as the dispatcher discussed in relation to FIG. 1, and the dispatcher 330 at the web server 325, FIG. 3. The analysis over the document is based on metadata to determine a document type. The analyzed metadata is metadata associated with the document, providing information for example for a file extension of the document. At 440, an application is determined to be associated with the document type of the document. The application is available for rendering the document. At 450, an associated OS is determined to be compatible with running the determined application at 440. For example, if the document is a WORD document, it may be determined that such a document may be rendered in a Microsoft® Word application, running on a Windows® 10 as an OS. At 460, it is determined whether an instance from the virtualized infrastructure runs the determined associated OS and application for rendering the document type of the document. At 470, upon successful determination that there is an instance that may be used for rendering the document, the instances is set into an active mode and the document is rendered at the application. In case, there is no instance that may accommodate rendering of the document, at the virtualized infrastructure layer, additional instance may be created, where the associated OS and application for rendering the document may be installed. On such an instance, the document may be displayed.

The determination of virtualized infrastructure and rendering of the document may be further associated with providing a remote display of the rendered document to a web browser through a virtual screen. The web browser may serve as an interface for communication with an end user investigating the document in a secure manner, where security risks of malicious software are minimized.

Further, a requested document for rendering may require different software functionality, including application and a compatible OS, which may be supported by a client machine, where the application receiving the rendering request is running. Therefore, rendering the requested document on a remote virtualized server side improves on native rendering of documents within the application through a virtual screen. Processing the rendering request may be performed without taking into consideration whether the required rendering functionality is supported for execution on the application, where the request was received.

Figure 5:
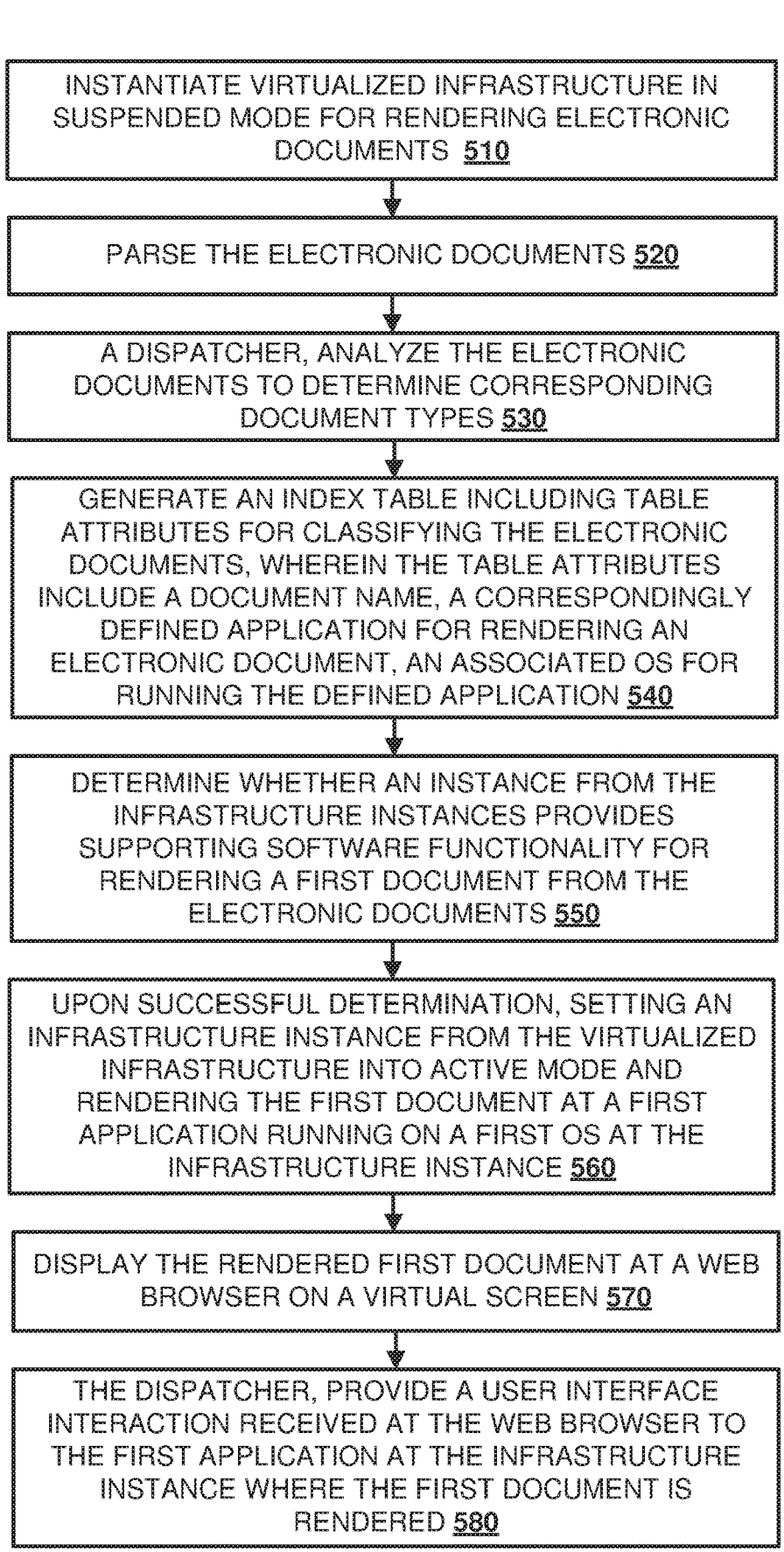
FIG. 5 is a flow diagram illustrating a process for displaying electronic documents on a virtual screen at a web browser, where the electronic documents is rendered on a virtualized server side, according to one embodiment.

FIG. 5 is a flow diagram illustrating a process 500 for displaying electronic documents on a virtual screen at a web browser, where the electronic documents is rendered on a virtualized server side, according to one embodiment. At 510, virtual infrastructure is instantiated in suspended mode for rendering electronic documents. The electronic document may be such as the documents stored at the mass storage 150, FIG. 1, and the evidence document stored as files 387, FIG. 1.

At 520, the electronic documents are parsed. The parsing of the document may be performed at a server side of an application, where the electronic files may be stored. At 530, a dispatcher, such as the dispatcher 330, FIG. 3, analyzes the parsed electronic documents. The dispatcher may be a module part of a backend application associated with the virtualization environment. The analysis of the documents is performed to determine corresponding document types. Different documents types may be associated with different software and hardware requirement for document rendering. Further, additional document characteristics may be determined in relation to the documents. For example, at 530, it may be determined a set of characteristics based on an analysis schema, defining attributes. The analysis attributes may be such as document name, document time stamp, document owner, storage file folder locator, required software application(s) for rendering, compatible OS(s). At 540, an index table is generated. The index table may be stored at a database, and may correspond to the discussed index table 145, FIG. 1 and the index table 345, FIG. 3. The index table generated at 540 includes table attributes for storing record at table rows. The defined table attributes are for classifying the electronic documents. The table attributes include a document name, a correspondingly defined application for rendering art electronic document, an associated OS for running the relevantly defined application. Further table attributes may be defined in relation to software and hardware requirement for rendering an electronic document from the electronic documents at a virtualized server side.

In one embodiment, a request associated with rendering a first document from the electronic documents may be received at a web browser. The web browser may serve as a front end for communication with end users. The web browser may be running on a local physical machine or on a remote one. However, the web browser is running separately from the virtualized server side. The request for rendering the first document may be transferred from the web browser to a web server part of the backend.

At 550, it is determined whether an instance from the infrastructure instances, defined at 510, provides supporting software functionality for rendering a first document from the electronic documents. The performed checking operation at 550 is associated with analyzing the index table and determining software functionality required for rendering the defined first document. Based on the acquired information from the index table, the instantiated virtualized infrastructure may be checked for existence of an instance complying with the software functionality required in relation to the first document. When such functionality is readily installed and kept in suspended mode at the virtualized infrastructure, the available instance may be set into an active mode. At 560, upon the successful determination of available instance, the instance is set in an active mode and the first document is rendered at a first application running on a first OS at the available instance. The first application and the first OS are such as to correspond to what is determined based on analyzing the index table and the determination at 550.

At 570, the rendered first document is displayed at the web browser, where the request was received from the user. The display of the rendered first document is through a virtual screen, as the actual rendering is performed at the virtualized server side as described above. At 580, the dispatcher provides a user interface interaction received at the web browser to the first application at the infrastructure instance where the first document is rendered. Therefore, smooth user interactions are achieved and the end user perceives the display of the first document as if it is rendered at the web browser. However, the actual accessing and opening of the document is performed at the server side outside of the infrastructure, where the web browser is running.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java™, C++, or other object-oriented programming language and development tools. Another embodiment may be implemented in hard-wired circuitry in place of, or in combination with machine readable software instructions.

Figure 6:
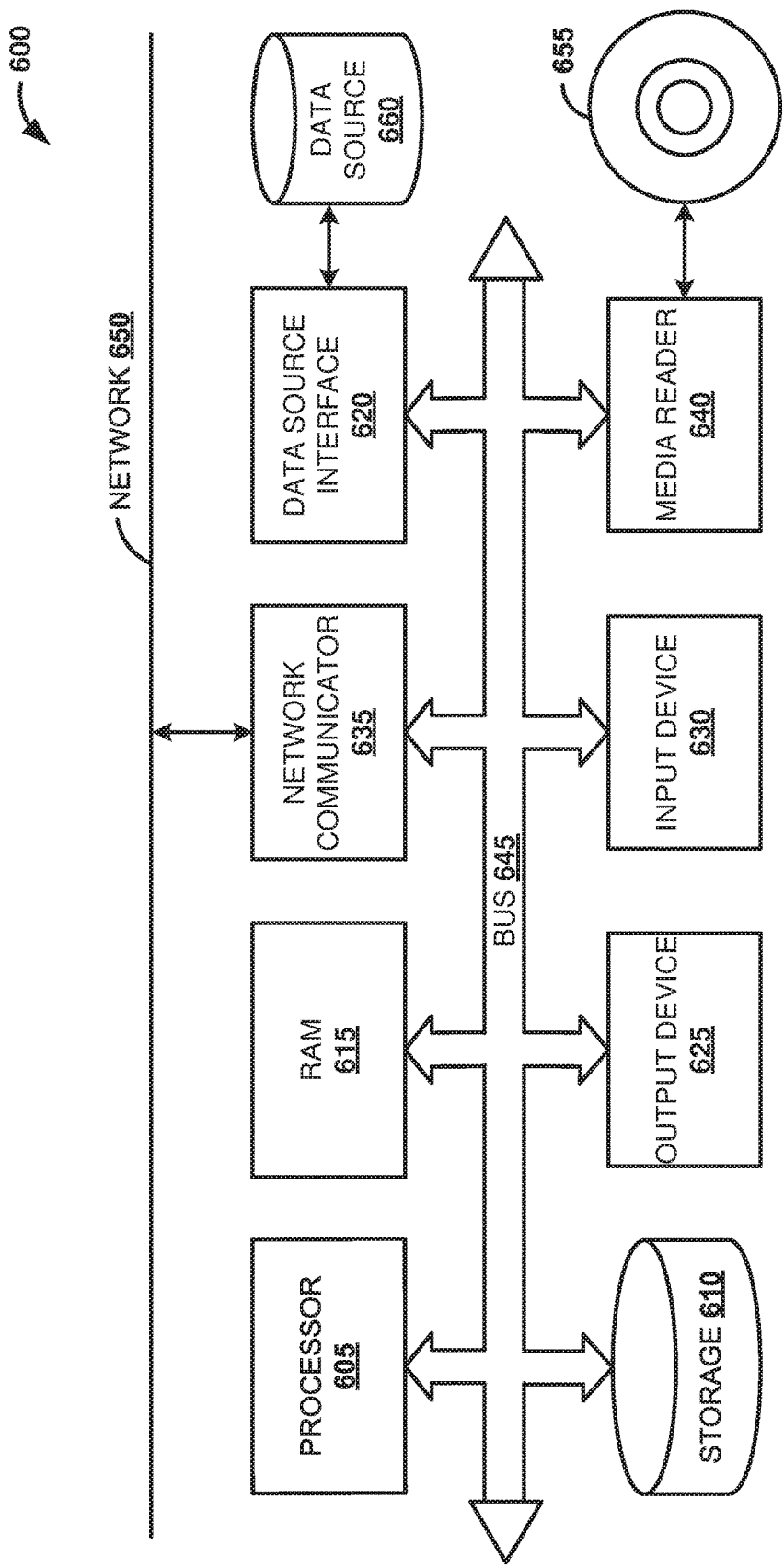
FIG. 6 is a block diagram illustrating an embodiment of a computing environment in which the techniques described for remote rendering of documents can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed, is:

1. A computer implemented method for a host system, comprising:
instantiating virtualized infrastructure instances remote from the host system, the virtualized infrastructure instances for running applications for rendering electronic documents;

pre-processing the electronic documents to generate an index table storing document characteristics relevant for rendering the electronic documents by:
  parsing an electronic document from the electronic documents;
  analyzing the electronic document using a dispatcher module to determine a document type, determine an application associated with the document type for rendering the electronic document, and determine an associated operating system for running the application based on metadata stored at a processing platform, wherein the metadata defines a mapping between a document type, a software application type available for rendering corresponding electronic documents, and an operating system type available for running the software application type;
receiving, at a server application executing on the host system, and from a user interface (UI) application remote from the host system and separate from the virtualized infrastructure instances, an identification of a first document from the electronic documents to be displayed in the UI application;
rendering the first document on a first virtualized infrastructure instance remote from the host system and selected from the instantiated virtualized infrastructure instances based on document characteristics of the first document stored in the index table;
receiving, at the host system, a virtual screen of the first virtualized infrastructure instance rendering the first document; and
transmitting the virtual screen of the first document from the server application executing on the host system to the remote UI application for display in the UI application, the instantiated virtualized infrastructure instances comprising virtualized infrastructure running operating system types and software application types defined in the metadata.

2. The method of claim 1, wherein the UI application is a web browser application, and wherein the electronic documents comprise active content associated with security risks.

3. The method of claim 1, wherein the virtualized infrastructure is kept in a suspended mode.

4. The method of claim 1, wherein pre-processing the electronic documents further comprises:
  generating the index table including table attributes for classifying the electronic documents, wherein the table attributes include a document name, a correspondingly defined application for rendering an electronic document, an associated operating system for running the defined application.

5. The method of claim 1, wherein rendering the first document includes:
  determining that the first virtualized infrastructure instance provides a software application for rendering the first document; and
  setting the first virtualized infrastructure instance into active mode and rendering the first document at a first application running on a first operating system at the first virtualized infrastructure instance.

6. The method of claim 1, further comprising:
  providing, by the dispatcher module, user interface interactions received at the UI application from a user to the first virtualized infrastructure instance where the first document is rendered.

7. A computer system comprising:
a processor;
a memory in association with the processor storing instructions related to:
  instantiate virtualized infrastructure instances remote from the computer system, the virtualized infrastructure instances for running applications for rendering electronic documents;
  pre-process the electronic documents to generate an index table storing document characteristics relevant to render the electronic documents by:
    parsing an electronic document from the electronic documents; and
    analyze, using a dispatcher module, the electronic document to determine a document type, determine an application associated with the document type to render the electronic document, and determine an associated operating system to run the application based on metadata stored at a processing platform, wherein the metadata defines a mapping between a document type, a software application type available for rendering corresponding electronic documents, and an operating system type available for running the software application type;
  receive, at a server application executing on the computer system, and from a user interface (UI) application remote from the computer system and separate from the virtualized infrastructure instances, an identification of a first document from the electronic documents to be displayed in the UI application;
  render the first document on a first virtualized infrastructure instance remote from the host system and selected from the instantiated virtualized infrastructure instances based on document characteristics of the first document stored in the index table;
  receive, at the computer system, a virtual screen of the first virtualized infrastructure instance rendering the first document; and
  transmit the virtual screen of the first document from the server application executing on the host system to the remote UI application for display in the UI application, the instantiated virtualized infrastructure instances comprising virtualized infrastructure running operating system types and software application types defined in the metadata.

8. The system of claim 7, wherein the UI application is a web browser application and the electronic documents comprise active content associated with security risks.

9. The system of claim 7, wherein the virtualized infrastructure is kept in a suspended mode.

10. The system of claim 7, wherein the instructions to pre-process the electronic documents further comprise instructions to:
  generate the index table including table attributes for classifying the electronic documents, wherein the table attributes include a document name, a correspondingly defined application for rendering an electronic document, an associated operating system for running the defined application.

11. The system of claim 7, wherein the instructions to render the first document comprise instructions to:
  determine that the first virtualized infrastructure instance provides a software application to render the first document; and
  set the first virtualized infrastructure instance into active mode and rendering the first document at a first application naming on a first operating system at the first virtualized infrastructure instance.

12. The system of claim 7, further comprising instructions to:
provide, by the dispatcher module, user interface interactions received at the UI application from a user at the first virtualized infrastructure instance where the first document is rendered.

13. A non-transitory computer-readable medium storing instructions, which when executed cause a computer system to:
instantiate virtualized infrastructure instances remote from the computer system, the virtualized infrastructure instances to run applications where electronic documents are to be rendered;
pre-process the electronic documents to generate an index table storing document characteristics relevant to render the electronic documents by:
parsing an electronic document from the electronic documents; and
analyzing, using a dispatcher module, the electronic document to determine a document type, determine an application associated with the document type to render the electronic document, and determine an associated operating system to run the application based on metadata stored at a processing platform, wherein the metadata defines a mapping between a document type, a software application type available to render corresponding electronic documents, and an operating system type available for running the software application type;
receive, at a server application executing on the computer system, and from a user interface (UI) application remote from the computer system and separate from the virtualized infrastructure instances, an identification of a first document from the electronic documents to be displayed in the UI application;
render the first document on a first virtualized infrastructure instance remote from the host system and selected from the instantiated virtualized infrastructure instances based on document characteristics of the first document stored in the index table;
receive, at the computer system, a virtual screen of the first virtualized infrastructure instance rendering the first document; and
transmit the virtual screen of the first document from the server application executing on the host system to the remote UI application for display in the UI application, the instantiated virtualized infrastructure instances comprising virtualized infrastructure running operating system types and software application types defined in the metadata.

14. The computer-readable medium of claim 13, wherein the instructions to pre-process the electronic documents further comprises instructions to:
generate the index table including table attributes to classify the electronic documents, wherein the table attributes include a document name, a correspondingly-defined application for rendering an electronic document, an associated operating system for running the defined application.

15. The computer-readable medium of claim 13, wherein the instructions to render the first document comprise instructions to:
determine that the first virtualized infrastructure instance provides a software application for rendering the first document; and
set the first virtualized infrastructure instance into active mode and render the first document at a first application running on a first operating system at the first virtualized infrastructure instance.

16. The computer-readable medium of claim 13, further storing instructions to:
provide, at the dispatcher module, user interface interactions received at the UI application from a user to the first virtualized infrastructure instance where the first document is rendered.

* * * * *